United States Patent
Lacivita et al.

(10) Patent No.: US 7,143,069 B2
(45) Date of Patent: Nov. 28, 2006

(54) SYSTEM AND METHOD FOR INTERACTIVE SECURE DIALOG BETWEEN CARD HOLDER AND ISSUER

(75) Inventors: Dennis Lacivita, Glendale, AZ (US); Michael Mansell, Cave Creek, AZ (US); Vernon Marshall, Montclair, NJ (US); Michael Mulder, Princeton, NJ (US); Sandeep Sacheti, Scottsdale, AZ (US); Brent Vallat, Summit, NJ (US)

(73) Assignee: American Express Travel Related Services Co., New York, NY (US)

( * ) Notice: Subject to any disclaimer, the term of this patent is extended or adjusted under 35 U.S.C. 154(b) by 805 days.

(21) Appl. No.: 10/155,360

(22) Filed: May 23, 2002

(65) Prior Publication Data

US 2003/0046235 A1 Mar. 6, 2003

Related U.S. Application Data

(60) Provisional application No. 60/293,601, filed on May 25, 2001.

(51) Int. Cl.
*G06F 17/60* (2006.01)
*G07F 7/12* (2006.01)

(52) U.S. Cl. .............................. 705/64; 705/44; 380/24; 380/23

(58) Field of Classification Search .................... 705/1, 705/64
See application file for complete search history.

(56) References Cited

U.S. PATENT DOCUMENTS 5,495,510 A    2/1996  Kimiavi
5,590,197 A *  12/1996 Chen et al. .................... 705/65
5,774,882 A    6/1998  Keen et al.
5,797,133 A    8/1998  Jones et al.
5,845,267 A    12/1998 Ronen
5,851,149 A    12/1998 Xidos et al.
5,870,723 A *  2/1999  Pare et al. .................... 705/39
5,878,403 A    3/1999  DeFrancesco et al.
5,890,137 A    3/1999  Koreeda
5,920,628 A    7/1999  Indeck et al.
5,956,024 A    9/1999  Strickland et al.

(Continued)

FOREIGN PATENT DOCUMENTS

EP          91400094.8      *   1/1991

OTHER PUBLICATIONS

Sage Software (software spec) date, author unknown.*

*Primary Examiner*—Pierre E. Elisca
*Assistant Examiner*—John M. Winter
(74) *Attorney, Agent, or Firm*—Fitzpatrick, Cella, Harper & Scinto (57) ABSTRACT

A computer implemented method and apparatus for ensuring secured dialog between a card holder and a card provider via a network is provided. The system facilitates real-time communicate between a card provider virtual agent and a card holder using a card holder interface operating via a network. In a typical arrangement, the card holder requests completion of a transaction from a merchant system via a network. The upon receiving notification that the transaction request has been denied by the card provider system, the card holder is provided real-time access to the card provider virtual agent. The virtual agent may then send a transaction approval code to the card provider system overriding any transaction denial and permitting the card holder to resubmit the transaction request to the merchant system for subsequent approval.

18 Claims, 5 Drawing Sheets

U.S. PATENT DOCUMENTS

| | | | |
|---|---|---|---|
| 5,987,132 A * | 11/1999 | Rowney | 705/77 |
| 5,987,498 A | 11/1999 | Athing et al. | |
| 5,991,750 A | 11/1999 | Watson | |
| 6,006,216 A | 12/1999 | Griffin et al. | |
| 6,014,645 A | 1/2000 | Cunningham | |
| 6,029,149 A | 2/2000 | Dykstra et al. | |
| 6,052,675 A | 4/2000 | Checchio | |
| 6,062,472 A * | 5/2000 | Cheung | 235/380 |
| 6,088,686 A | 7/2000 | Walker et al. | |
| 6,092,057 A | 7/2000 | Zimmerman et al. | |
| 6,123,223 A | 9/2000 | Watkins | |
| 6,141,651 A | 10/2000 | Riley et al. | |
| 6,188,994 B1 | 2/2001 | Egendorf | |
| 2001/0051920 A1 * | 12/2001 | Joao et al. | 705/41 |
| 2002/0120537 A1 * | 8/2002 | Morea et al. | 705/35 |

\* cited by examiner

SYSTEM AND METHOD FOR INTERACTIVE SECURE DIALOG BETWEEN CARD HOLDER AND ISSUER

RELATED APPLICATIONS

This patent application claims priority to, and the benefit of, the U.S. provisional patent application U.S. Ser. No. 60/293,601, filed May 25, 2001, which is incorporated by reference.

BACKGROUND OF THE INVENTION

1. Field of the Invention

This invention generally relates to a system for direct secure communication, and more particularly, to a system for direct secure communication between a card issuer and a card holder via the internet.

2. Description of Related Art

As e-commerce rapidly grows and expands into new market spaces, an increasing number of commercial sales are being performed over the internet. In a typical transaction, the card holder will attempt a purchase over the internet using a transaction card (e.g., credit or debit card), wherein a transaction card number or account number is sent over the internet to a merchant who then sends the account number to a transaction card issuer to authorize the sale. Where the authorization for the sale is declined by the card issuer (e.g., card provider), the transaction card holder is typically not immediately made aware of the reasons for the decline. Instead, the card holder is forwarded a generic message informing the card holder that the card has been declined or that an alternate method of payment must be provided to the merchant. The card holder must either contact the card issuer directly or wait for a communication from the merchant or the card issuer to resolve the declining issues. A system is therefore needed which will allow the declined card holder to communicate directly with the card issuer at the time of the attempted sale, whereby the declining issue may be resolved immediately. Alternatively, a system is needed which will allow a card holder direct access to the card provider, via a network, at the card holder's initiative. Such a beneficial system may allow the card holder to communicate directly with the card issuer without human intervention on the part of the merchant. This, in turn, will allow immediate resolution of the declining issue and preservation of the sale on behalf of the merchant.

Presently, no known sufficient system or method for allowing a card holder direct communication with the card issuer to resolve declining issued via internet exists. There are various systems and methods described in the prior art, however, which address the similar problem of ensuring card holder approval for an internet transaction. However, these systems typically focus on pre-authorizing the card holder prior to initiating the transaction. One such system, disclosed in U.S. Pat. No. 6,052,675 issued Apr. 18, 2000 to Checchio, teaches pre-authorizing a transaction card for a particular transaction and subsequently initiating the authorized transaction at the merchant location using a transaction card communicating device. The system disclosed in Checchio allows the card holder to submit to a card issuer evaluation server information concerning the merchant location and the amount to be charged to the transaction card account. The information is submitted via the communicating device. The evaluation server receives the information and determines if the purchase should be authorized, whereby a transaction acceptance code is stored in a network authorization database for later access by the merchant. The communicating device in Checchio, provides the card holder with means for ensuring that his transaction will be accepted prior to initiating the transaction with the merchant.

While the Checchio system may be adequate for ensuring that a transaction may be pre-approved prior to initiating the transaction, the system is insufficient for use in instances where the transaction card has been denied, and the card holder still desires to complete the transaction. For example, the Checchio system does not permit a card holder access to the card issuer transaction evaluation server for resolving any declining issue. Consequently, where a card holder wishes to resolve the denial issues and complete the transaction, the card holder must either call the card issuer directly or wait for the merchant or card issuer to contact the card holder to attend to the denial issues preventing the completion of the transaction. This non-immediate direct access to the card issuer is especially troublesome to the card holder where the card holder wishes to complete the transaction via the internet.

A system is therefore desired which will allow the customer to communicate directly with the card holder via the internet for the purpose of immediately resolving any denial issues.

SUMMARY OF THE INVENTION

The present invention provides a method and system for providing a card holder direct access to a card provider via the internet which addresses many of the shortcomings of the prior art. In accordance with various aspects of the present invention, a card holder may directly communicate with a card provider concerning transaction account charge status (e.g., approval or denial, etc.). In one aspect of the invention, the card holder attempts to complete a transaction with a merchant (e.g., point of sale) via the internet. The card holder provides the merchant with a transaction card account number corresponding to a credit, debit or other similar transaction account (collectively called "account information" or "card information" herein) for completion of the transaction. The merchant receives the account information and sends the account information to a provider of the account for authorization of the transaction. The card provider then evaluates the account status to determine if the transaction can be authorized. Where the transaction is not approved, a message is sent from the card provider to the merchant informing the merchant of the denial. Alternatively, the card provider may send the merchant a message instructing the merchant to call the card provider to receive telephonic authorization.

If authorization is not granted, the merchant sends a message to the card holder informing the card holder of the denial status. At which point, card holder may contact the card provider via the internet to engage in real-time communications to determine the reasons for the denial. Communication is made by the card holder to a transaction card provider virtual authorizer who may then determine if the transaction may be approved or denied. Where the transaction is approved, the virtual authorizer sends a message to the card provider server which may override the charge account denial status permitting the transaction to be completed. The card holder may then resubmit the transaction request to the merchant who may then resubmit the authorization request to the card provider for subsequent approval.

In accordance with one embodiment of the invention, the denial message may be sent to the card holder at the time of the transaction request, whereby the card holder may be immediately prompted to contact the card provider. The card holder may contact the card provider virtual authorizer by clicking on a card provider hyperlink which, in turn, would transfer the card holder to an identity verifying sequence for use in ensuring the card holder's identity. Once the card holder's identity is verified, the card provider may be prompted to determine if real-time communication should be made with the card provider virtual authorizer through text chat or voice chat via the internet. The virtual authorizer may then communicate with the card holder real-time to discuss and resolve the denial issues. Once the denial issues are resolved, the virtual authorizer may send a code, command or message to the card provider server overriding the denial status, such that the transaction, once resubmitted to the merchant by the card holder, may be approved by the card provider.

In accordance with another embodiment of the invention, the denial message may be forwarded to an e-mail account of the card holder. The denial message may include a hypertext link to the card provider, through which the card holder may be transferred to the card provider identity verifying sequence for ensuring the identity of the card holder. Once the card holder's identity is verified, the card holder is permitted to communicate directly to the card provider virtual authorizer in real-time. The card provider may be prompted to determine if communication should be made with the card provider virtual authorizer through text chat or voice chat via the internet. Once the denial issues are resolved, the virtual authorizer may send a command or message to the card provider server overriding the denial status, such that the transaction, once resubmitted to the merchant by the card holder, may be approved by the card provider.

BRIEF DESCRIPTION OF THE DRAWINGS FIGURES

A more complete understanding of the present invention may be derived by referring to the various exemplary embodiments of the present invention which are described in conjunction with the appended drawing figures in which like numerals denote like elements, and in which.

DETAILED DESCRIPTION OF VARIOUS EXEMPLARY EMBODIMENTS

The present invention may be described herein in terms of functional block components and various processing steps. It should be appreciated that such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

In addition, it should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiment, the invention is described as pertaining to a system facilitating communication between a card holder and card provider using a system running over a computer network such as the Internet. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. The users may interact with the system via any input device ( e.g. car holder interface) such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols.

Further, the present invention might employ any number of conventional techniques for data transmission, signaling, data processing, network control, and the like. For example, radio frequency (RF) or other wireless techniques could be used in place of any network technique described herein.

Further still, the terms "Internet" or "network" may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

Additionally, it will be appreciated that many applications of the present invention could be formulated. For example, the system could be used to gain transaction approval when the card holder requests completion of a transaction using any convention credit, debit, merit or other similar account providing the account holder purchasing or redeeming capabilities.

Furthermore, the merchant and the provider, described herein, may represent individual people, entities, or business, and while reference is made to American Express®, or any other credit card provider, this is by way of example and the financial authorization entity may represent various types of card issuing institutions, such as banks, credit card companies, card sponsoring companies, or third party issuers under contract with financial institutions. The payment network (e.g., transaction processing network or system) includes existing proprietary networks that presently accommodate transactions for credit cards, debit cards, and other types of financial/banking cards, such as, for example, the American Express®, and VisaNet® network.

Figure 1:
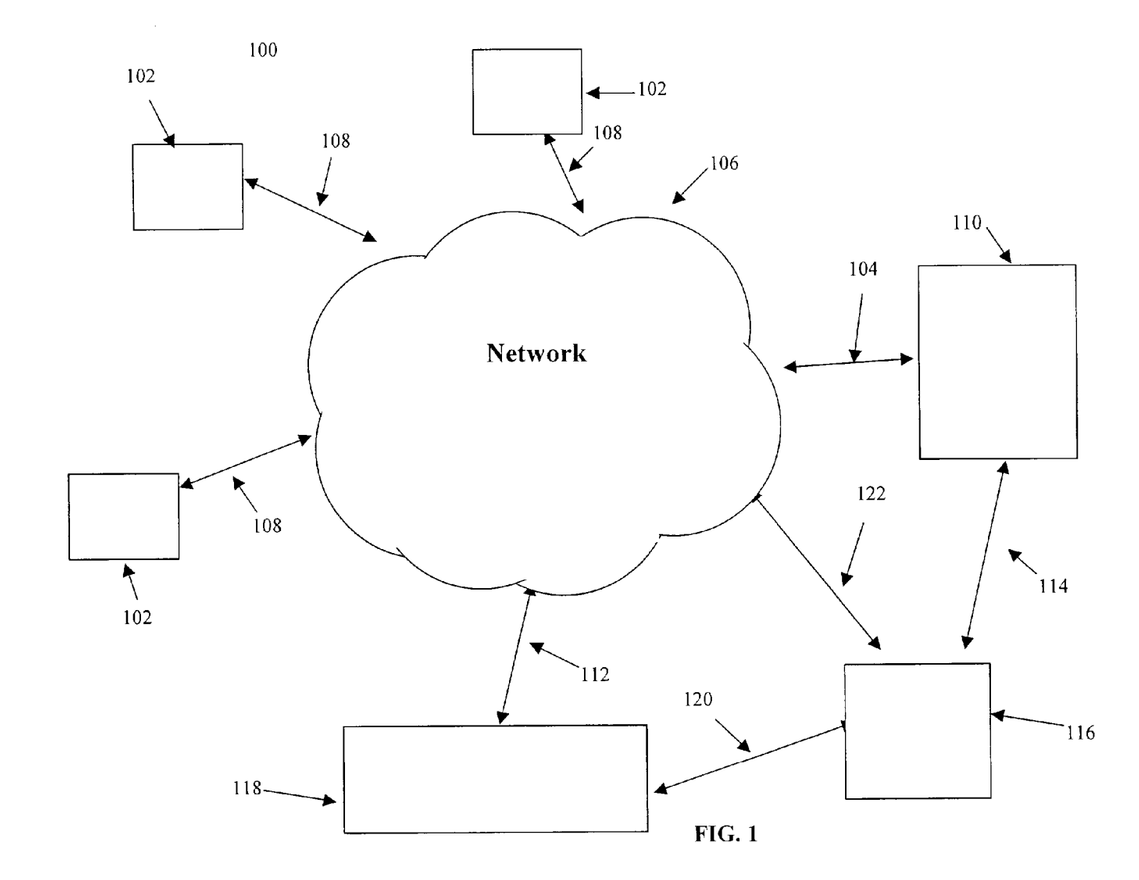
FIG. 1 is a system level block diagram of an exemplary embodiment of the card holder to card issuer interactive secure dialog system in accordance with the present invention.

FIG. 1 is a system level block diagram of an exemplary card holder to card provider communication or dialog system 100 in accordance with this invention. With reference to FIG. 1, in general, card holder interface systems 102 communicate with a merchant server system 110 (e.g., merchant transaction processing system) via a network 106 to send and/or receive information (e.g., card holder identity, charge account number, expiration date, items ordered etc.) related to a card holder's transaction request. In an exemplary embodiment, merchant system 110 may receive the transaction request from card holder interface 102 via the internet 106 and seek authorization of the transaction from a card provider server 116. The merchant may request authorization from the card provider server 116 via communication lines 104 and 122 via the internet or alternatively, may request authorization directly from the server 116 via a suitable communication line 114. The card provider server 116 may then determine whether the transaction request should be approved or denied and return the correlative response to the merchant server 110 via at least one of the communication lines 104, 114, or 122. Via the internet, the merchant server 110 may then transmit the approval or denial message to the card holder interface 102 or to an individual message account or e-mail account which may be accessed by the individual card holder interface 102. If the transaction is approved, the transaction may be completed under business as usual standards defined by the merchant. Contrarily, if the transaction is denied by the card provider server 116, the merchant may provide the card holder with means for accessing a card provider virtual authorizing agent 118 of the card provider via the card holder interface 102 and the internet 106, as discussed more fully below. The card holder may then communicate directly to the card provider virtual agent and seek to resolve the denial issues.

If the denial issues are resolved such that the transaction may be completed, the virtual authorizer 118 may then send an authorizing message or command (e.g., override code) to the card provider server 116 via communication online 120 for overriding the denial status of the card account permitting the card holder to resubmit the transaction request to the merchant server 110 for subsequent approval.

While the terms "credit card accounts," "card holder account" or "credit card" may be used in the exemplary embodiments, the invention contemplates the use of any type of financial or transaction account, whether or not associated with a physical card, such as, for example, debit card, charge card, smart card, bar coded card, magnetic stripe card, temporary use account number, brokerage account, 401K plan, stock account, telephone account, utility account, loyalty point account, and/or the like. One such transaction account which is suitable for use with this invention is the described by Bishop et al., in the U.S. patent application Ser. No. 09/652,899 entitled "Methods and Apparatus for Conducting Electronic Transactions" filed Aug. 31, 2000 (herein incorporated in its entirety by reference).

Card holder interface 102 may include any convenient combination of hardware and software components configured to allow a merchant to communicate over network 106. For example, card holder interface 102 might include a standard personal computer (PC) comprising a CPU, monitor, storage, keyboard, mouse, and communication hardware appropriate for the given data link 104 (e.g., V.90 modem, network card, cable modem, etc.). In alternate embodiments, card holder interface 102 may be a personal data assistant (PDA) capable of manipulating images and communicating with merchant server 110. Card holder interface 102 typically includes an operating system (e.g., Windows 95/98/2000, Linux, Solaris, MacOS, and/or the like) as well as various conventional support software modules and drivers typically associated with computers. Card holder interface 102 may also include application software configured to communicate over network 106 with merchant server 110, for example, a world wide web (WWW) browser or any other communication software. In an exemplary embodiment, card holder interface 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Card provider server 116 may comprise any number of hardware, software, and networking components configures to communicate with user interface 102, merchant system 110 or virtual authorizer 118 via a network 106, as described in further detail below. In one embodiment, Sun Ultra SPARC Enterprise 250 and 450 servers may be used in conjunction with a Sun Solaris 7 or Linux operating system, Apache web server software, and an Oracle 8 or MYSQL database system. Of course particular hardware and software components used in card provider server 110 will vary widely from embodiment to embodiment. Furthermore, card provider server 110 may represent a "cluster" or group of separate computer systems providing the functionalities described herein.

In a typical card provider environment, distinct card holder account information, such as card holder identity, account number, account balance, amount available, etc., may be maintained in a database location (not shown) by card provider server 116. The database may be a graphical, hierarchical, relational, object-oriented or other database, and may be maintained on a local drive of server 116 or on a separate computer coupled to server 116 via a local area or other network (not shown). In one embodiment, the database may be a collection of ASCII or other text files stored on a local drive of server 116. Card holder account information may be suitably retrieved from the database and provided to virtual authorizer 118, upon request via a server application, as described more fully below.

Within each card provider database, there is stored a plurality of individual data locations corresponding to the credit card accounts of credit card holders. In one embodiment, the server 110 is managed by a credit card provider with which the card holder has established a billing account. The billing account may be associated with any suitable credit card service such as Visa®, MasterCard®, American Express®, Discover®, or the like. Further, the billing account may additionally allow the merchant to recover payment for charges made through the merchant by an individual customer who is a subscriber of the credit card service.

Merchant system 110 may be any conventional system known in the art, including means for receiving card holder transaction request (e.g., purchases) via the internet, processing such transaction request and sending confirmation or denial of the transaction to card holder interface 102. Additionally, virtual authorizer system 118 may be of similar construction and description as was described with respect to the card holder interface 102. As such, the descriptions of the merchant system 110 and the virtual authorizer 118 are not recounted or repeated, herein, for brevity.

Merchant system 110, card holder interface 102, virtual authorizer system 118 and card provider server 116 may be suitably coupled to network 106 via data links 104, 108, 112 and 122 respectively. Similarly, merchant server 110 may be suitably coupled to card provider server 116 via data link 114, and card provider server 116 may be suitably coupled to virtual authorizer 118 via data link 120. Alternatively, merchant system 110 may be coupled to card provider server 116 via data links 104 and 122 and via the network 106.

A variety of conventional communications media and protocols may be used for data links 104, 108, 112, 114, 120, and 122. Such links might include, for example, a connection to an Internet Service Provider (ISP) over the local loop as is typically used in connection with standard modem communication, cable modem, Dish networks, ISDN, Digital Subscriber Line (DSL), or various wireless communication methods. In addition, card holder interface system 102, merchant system 110, virtual authorizer system 118 and card provider server 116 might each independently and separately, or collectively, reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Figure 2A:
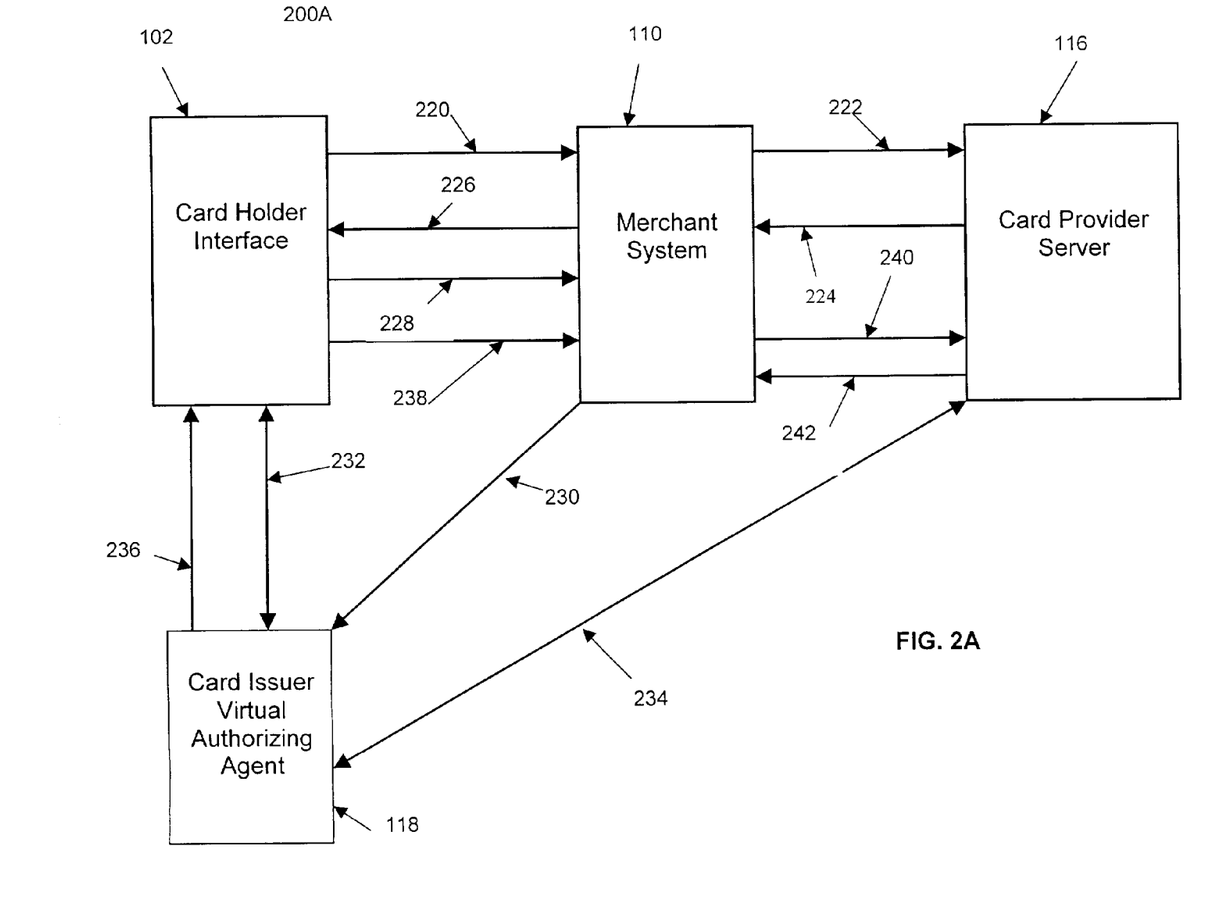
FIG. 2A is a block diagram of an exemplary embodiment of the card holder to card issuer interactive secure dialog system in accordance with the present invention.

The operation of the present invention may be more fully understood with reference to FIGS. 2A–3B and continued reference to FIG. 1, wherein exemplary embodiments of the system and method of card holder to card provider dialog in according with the present invention is shown. With reference to FIG. 2A, what is shown is an exemplary embodiment of a card holder to card provider dialog system in accordance with the present invention wherein the card holder may be provided access to the card provider virtual authorizer concurrent with the card holder transaction request process. That is, the card holder may be provided access to the virtual authorizer during the processing of the card holder transaction request sequence. As shown, the transaction request process is illustrated using a sequence of steps represented by numbered arrows (e.g., 220–242). At step 220, using the card holder interface 102, the card holder submits a transaction request to the merchant system 110, preferably via a network 106. At the merchant location, the merchant system 110 receives the transaction request and seeks authorization for completion of the card holder request from the card provider server 116 (step 222). As noted, the merchant authorization request may be sent to the card provider server 116 via the network 106, or directly via a suitable communication line 114.

The card provider server 116 evaluates the status of the card holder account to determine if the transaction should be denied or approved. At step 224, a message approving or denying the transaction is then sent from the card provider server 116 to merchant system 110, where the message is forwarded to the card holder interface 102 (step 226) for reading or otherwise informing the card holder during the transaction process. Where the transaction is approved, the transaction is completed under business as usual standards as defined by the merchant. On the other hand, where the transaction request is denied by the card provider, a denial message is forwarded to card holder while the card holder remains in communication with the merchant system 110. Where the merchant performs real-time authorizations, the denial message may be provided to the card holder using a separate web window which may be populated on the card holder interface 102.

The denial message received by the card holder may be accompanied by means for the card holder to immediately contact the card provider for resolution of the denial issues. That is, the card holder may be given an opportunity resolve the denial issues in real-time and resubmit the transaction request. The means for contacting the card provider may include any suitable method for allowing the card member to communicate with the card provider via the internet. Such means may include, for example, a hypertext link, which when clicked by the card holder will transfer the card holder to a web location maintained by the card provider. The method of clicking hypertext links and being transferred to a corresponding web site is well known in the art, and as such will not be described herein. Further, the hypertext link provided to the card holder may be any such card provider identifier capable of transferring the card holder to a virtual location where the card holder's transaction account is managed.

Once the transferring hypertext link is clicked by the card holder, the card holder may be transferred from the merchant system 110 to a card provider virtual authorizing agent (step 230). As noted, the virtual authorizing agent 118 is provided with access to the card holder account data stored on the card provider server 116. The virtual authorizing agent 118 is further provided the ability to send a suitable command (e.g., override code) to the card provider server 116, overriding the denial status of the transaction attendant to the card holder's charge account.

Prior to being permitted to communicate with the virtual agent 118, the card holder may be prompted to provide information confirming the card holder's identity. Such information may include providing, for example, card holder name, account number, social security number, birth date, a secret password or the like. Alternatively, any known authorization, verification or hand-shake routine can be used. Once the card holder's identity is verified, the card holder may be permitted to communicate with the card provider virtual agent 118 in real-time (step 232).

The essence of the communication between the card holder and the virtual agent 118 may be determined by the nature of the conditions giving rise to the card holder's denial status. For example, the card holder may be late in delivering payments due to the card provider, the transaction card used may be invalid or expired, or any such denial condition as determined by the card provider. Considering the relevant denial issue (e.g., fraudulent identification, stolen card, high credit risk or credit exposure, delinquency in payment, etc.), the card holder and the virtual agent 118 may be able to resolve the denial issue whereby the virtual agent may send a message or command to the card provider server 116 which may override the cardholder's denial status and permit the transaction to be completed upon resubmission to the merchant system 110 (step 234). The virtual authorizing agent 118 may then send a message to the card holder interface 102 informing the card holder of the removal of his denial status, and further informing the card holder that the card holder's transaction request will be approved by the card provider server 116 once the transaction request is resubmitted to the merchant system 110 (step 236).

Upon notification that the transaction will be accepted, the card holder may then resubmit the transaction request to the merchant location (step 238) and the merchant system may again request approval of the transaction from the card provider (step 240). Since the card holder's denial status has been removed from (e.g., overridden at) the card provider server 116, the card provider server 116 returns a transaction approved message to the merchant system 110, and the transaction may be completed under the business as usual standards defined by the merchant (step 242).

Figure 3A:
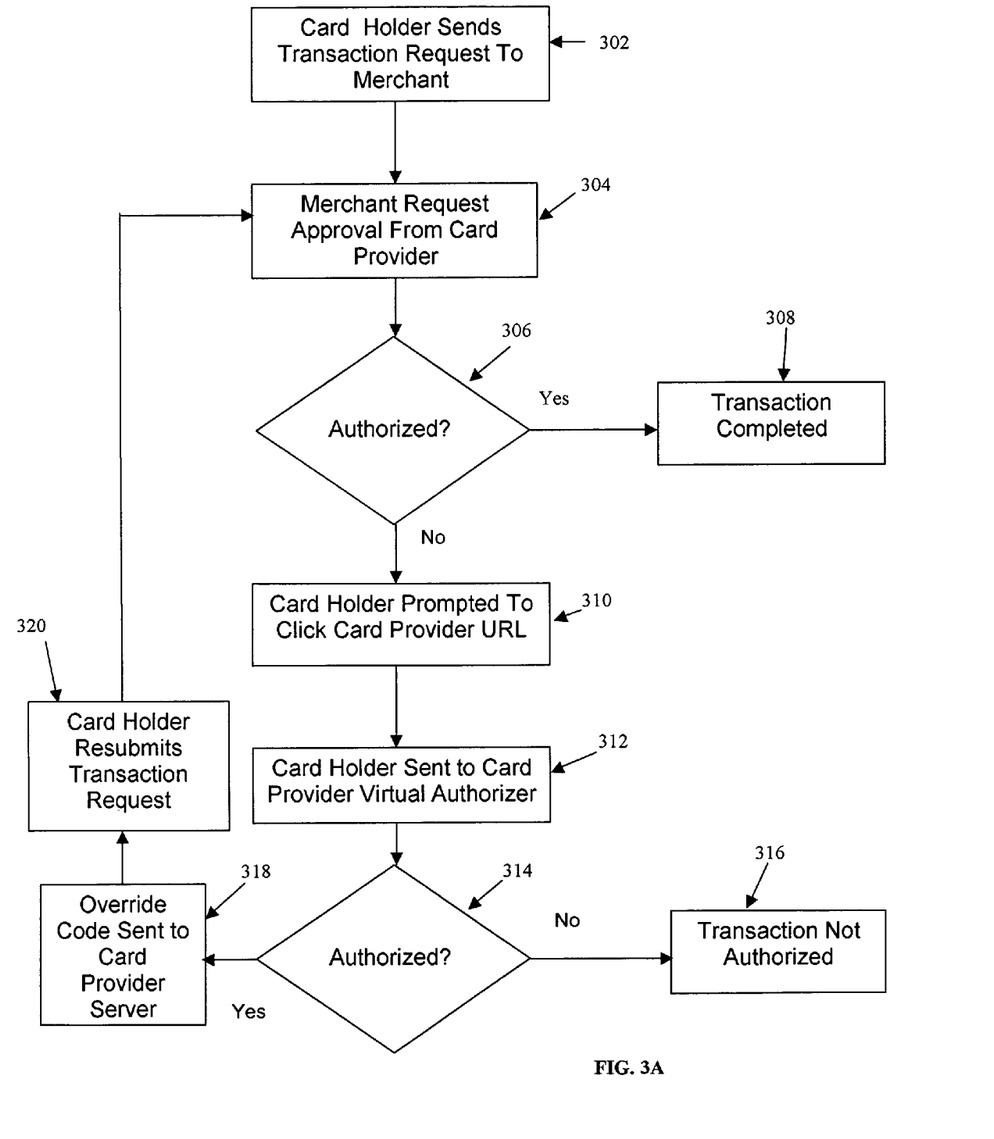
FIG. 3A is an exemplary decision flow chart of the card holder to card issuer interactive secure dialog method in accordance with the present invention.

The operation of the exemplary embodiment in FIG. 2A may be further understood with reference with the decision flowchart shown in FIG. 3A, wherein all related communications preferably take place via a network such as the internet. As shown, the transaction process may begin when the card holder, using a transaction account, sends a transaction request to the merchant system (step 302). The merchant then requests approval from a transaction account or card provider corresponding to the account number provided by the card holder (step 304). At the card provider location, the card provider determines whether the transaction request should be approved (step 306). Where the transaction is approved by the card provider, an message is sent to the merchant and the transaction is completed under the merchant's business as usual standards (step 308). In another embodiment, where the transaction request is denied, the card holder is transmitted a denial message accompanied by a means, such as a hypertext URL, to transfer the card holder to the web location (e.g., web site) of the card provider (step 310). Upon clicking the provided hypertext, the card holder is sent to a card provider virtual authorizer (step 312) where the card holder's identity is verified, and the card holder is permitted to enter into communications regarding his denial status. As noted, the communication between the card holder and the virtual authorizer may end in the card holder's transaction request again being denied. Where the transaction is denied, the transaction is not authorized (step 316) and the transaction process is terminated. On the other hand, the communication between the card holder and the virtual authorizer may end in the transaction being approved, whereby the virtual authorizer may send an approval code or command to the card provider server overriding the card holder's denial status (step 318). The card holder may then resubmit the transaction request to the merchant system (step 320 allowing the merchant to submit the transaction to the card provider for approval (step 304).

Figure 2B:
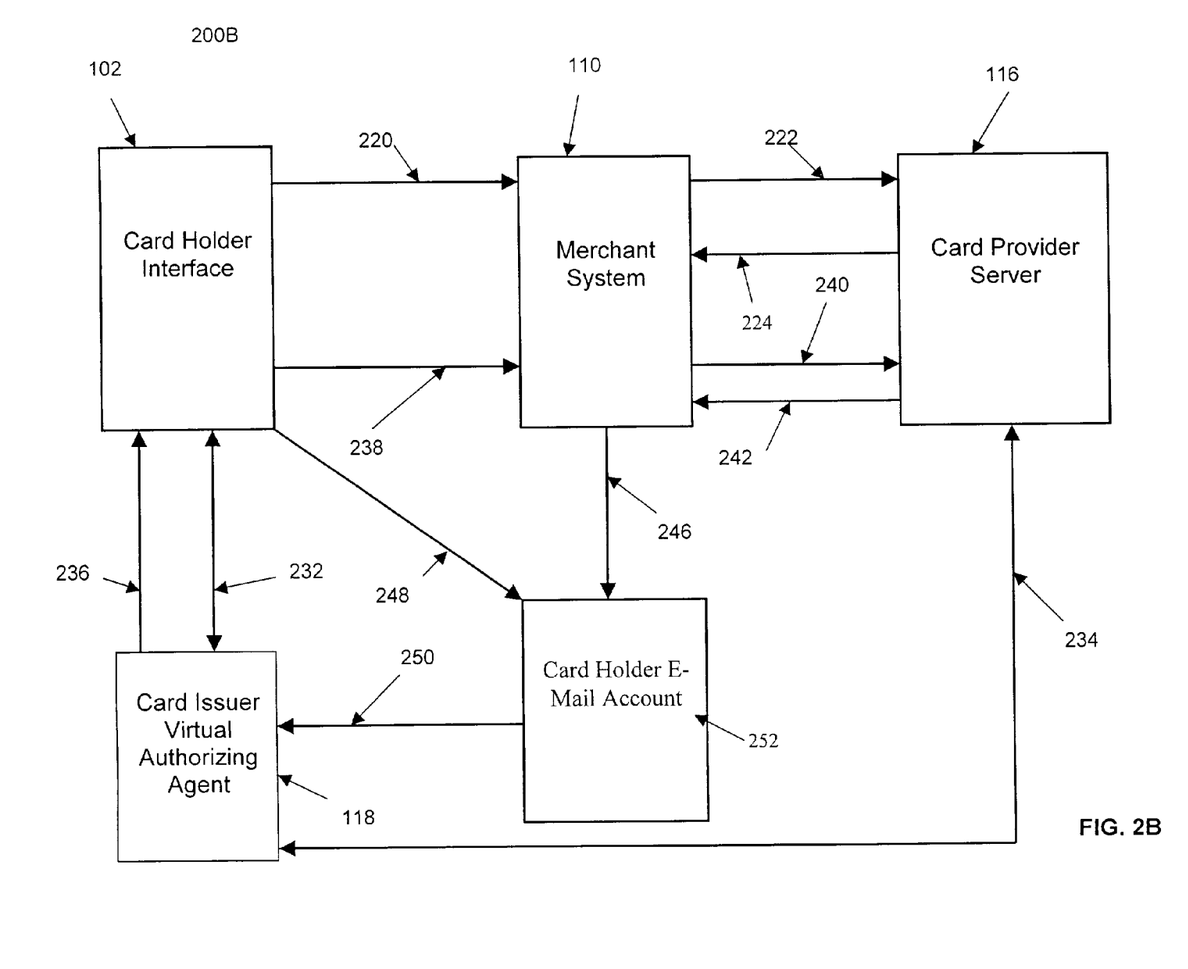
FIG. 2B is a block diagram of another exemplary embodiment of the card holder to card issuer interactive secure dialog system in accordance with the present invention.

With reference to FIG. 2B, what is shown is another exemplary embodiment of a card holder to card provider dialog system in accordance with the present invention wherein the card holder may be provided access to a card provider virtual authorizer via an e-mail message sent to a card holder message receiving e-mail account, where a means for contacting the virtual authorizer is included in the transmitted e-mail message. That is, included in the email may be a means, such as a hypertext link, for transferring the card holder to a webs site managed and maintained by the card provider. At the web site location, the card holder may be permitted to communicate with a virtual agent of the card provider, who has the ability to authorize a change in the transaction status of the card holder.

As shown, the dialog process according to this exemplary embodiment is illustrated using a sequence of steps represented by numbered arrows (e.g., 220–250). It should be noted that steps 220, 222, and 224 may occur in the same sequence as similarly numbered steps with respect to FIG. 2B, and as such, may have similar descriptions as those steps. That is, the transaction process in accordance with this embodiment may be initiated by a card holder who submits a transaction request to a merchant via a network such as the internet (step 220). The merchant may request authorization for completion of the transaction from the card provider (step 222) and the card provider may return an approval or denial message (step 224).

As noted with respect to FIG. 2A, the message returned to the merchant system may be an approval or denial of the transaction. Where the transaction is approved, the transaction may be completed under business as usual standards as defined by the merchant. In this exemplary embodiment, where the transaction is denied by the card provider, the merchant may transmit to the card holder notification that his transaction has been denied. In one embodiment the message may be forwarded to an account for receiving such messages established or maintained by the card holder (step 246). As shown, one such account may be a general e-mail account 252, such as the kind commonly found in the art.

Where a denial message is received by the card holder, the message may be accompanied by means for the card holder to immediately contact the card provider for resolution of the denial issues, such that described with respect to FIG. 2A. As noted, such means may include a hypertext link, which when clicked by the card holder will transfer the card holder to a web location maintained by the card provider. Once the transferring hypertext link is clicked by the card holder, the card holder may be transferred from the e-mail account 252 to a card provider virtual authorizing agent (step 250). As noted, via communications line 234, the virtual authorizing agent 118 is provided with access to the card holder account data stored on the card provider server 116. The virtual authorizing agent 118 is further provided the ability to send a suitable command to the card provider server 116, overriding the denial status of the transaction attendant to the card holder's charge account.

Prior to being permitted to communicate with the virtual agent 118, the card holder may be prompted to provide information confirming the card holder's identity. Such information may include providing, for example, card holder name, account number, social security number, birth date, a secret password or the like. Once the card holder's identity is verified, the card holder may be permitted to communicate with the card provider virtual agent 118 in real-time (step 232).

Considering the relevant denial issue, the card holder and the virtual agent 118 may be able to resolve the denial issue, whereby the virtual agent may send a message or command to the card provider server 116 which may override the card holder's denial status and permit the transaction to be completed upon resubmission to the merchant system 110 (step 234). The virtual authorizing agent 118 may then send a message to the card holder interface 102 informing the card holder of the removal of his denial status, and further informing the card holder that the card holder's transaction request may be approved by the card provider server 116 once the transaction request is resubmitted to the merchant system 110 (step 236).

Upon receipt of the removal of denial status, the card holder may then resubmit the transaction request to the merchant location (step 238) and the merchant system may again request approval from the transaction from the card provider (step 240). Since the card holder's denial status has been removed from the card provider server 116, the card provider server returns a transaction approved message to the merchant system 110, and the transaction is completed under the business as usual standards defined by the merchant (step 242).

Figure 3B:
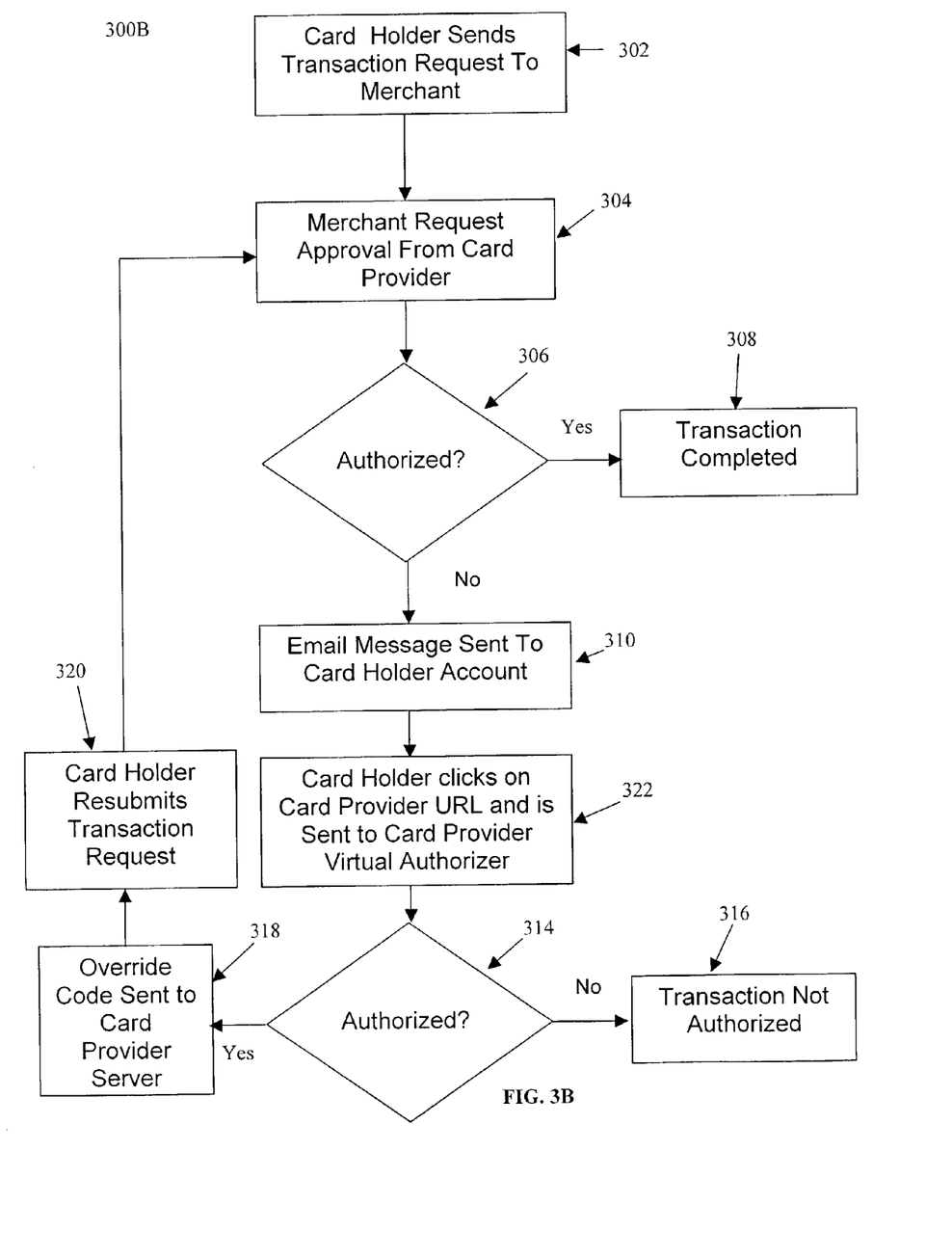
FIG. 3B is another exemplary decision flow chart of the card holder to card issuer interactive secure dialog method in accordance with the present invention.

The operation of the exemplary embodiment in FIG. 2B may be further understood with reference to the decision flowchart shown in FIG. 3B, wherein all related communications preferably take place via a network such as the internet. As shown, the transaction process may begin when the card holder, using a transaction account, sends a transaction request to the merchant system (step 302). The merchant then request approval of the transaction account from a card provider wherein the transaction account corresponds to the account number provided by the card holder (step 304). At the card provider location, the card provider determines whether the transaction request should be approved (step 306). Where the transaction is approved by the card provider, a message is sent to the merchant and the transaction is completed under the merchant's business as usual standards (step 308). Contrarily, where the transaction request is denied, a denial message, accompanied by a means, such as a hypertext URL, for transferring the card holder to the web location (e.g., web site) of the card provider (step 322), is forwarded to the card holder email account. Upon clicking the provided hypertext, the card holder is sent to a card provider virtual authorizer (step 324) where the card holder's identity is verified, and the card holder is permitted to enter into communications regarding his denial status. As noted, the communication between the card holder and the virtual authorizer may end in the card holder's transaction request again being denied. Where the transaction is denied, the transaction is not authorized (step 316) and the transaction process is terminated. On the other hand, the communication between the card holder and the virtual authorizer may end in the transaction being approved, whereby the virtual authorizer may send an approval code or command to the card provider server overriding the card holder's denial status (step 318). The card holder may then resubmit the transaction request to the merchant system (step 320) allowing the merchant to submit the transaction to the card provider for approval (step 304).

It should be understood that the present invention has been described above with reference to various exemplary embodiments and process steps as they concern database updating. Those skilled in the art, however, will recognize that changes and modifications may be made to the exemplary embodiments and process steps without departing from the scope of the present invention. For example, the various processing steps, as well as the components for carrying out the processing steps, may be implemented in alternate ways depending upon the particular application or in consideration of any number of cost functions associated with the operation of the system, e.g., various of the steps may be deleted, modified, or combined with other steps, such as providing means to the virtual authorizer for checking the identity of the card holder during the dialog between the card holder and the virtual authorizer, or providing means for the virtual authorizer to communicate with the merchant directly (e.g., sending a transaction approval message to the merchant).

Further still, it should be noted that while the card holder to card provider dialog system described above is suitably for use by any suitable credit card provider, the system is not limited to use with credit card databases. For example, the system may be used with any system wherein a card holder has established a debit, credit or similar account. In addition, the present system may be used with any banking, brokerage, travel account, etc. wherein the holder of the account may wish to obtain real-time approval of an attendant transaction. In this instance, the system described above may be used to establish dialog, via the internet, between the transaction account provider and its account holder.

These and other changes or modifications are intended to be included within the scope of the present invention, as set forth in the following claims.

What is claimed is:

1. A computer implemented system for facilitating secure dialog between a card holder and a card provider via a network, comprising:

a card provider server including a database of information having a plurality of card holder accounts data, the account data including at least a card holder status, the card provider server configured to manipulate the database;

a computer network;

a remote card holder interface for providing card holder access to the network;

a card provider virtual agent for communicating with the card holder interface and the card provider server to facilitate authorization of transactions; and a merchant processing system for communicating with the card holder interface and the card provider server, the merchant processing system for receiving a transaction request from the card holder interface, sending a transaction authorization request to the card provider server, and receiving a transaction authorization notice from the card provider server, the transaction authorization notice comprising an approval notice or a denial notice from the card provider server, wherein, in response to a denial notice from the card provider server, the merchant processing system provides a notification, in accordance with the transaction authorization notice, to the card holder interface, and the notification includes a linking means configured to enable the card holder to establish communication with the virtual agent through the card holder interface regarding the denied transaction request by selecting the linking means, which selection transmits information relating to the customer and the denied transaction to the virtual agent.

2. A computer implemented system for ensuring secure dialog between a card holder and a card provider via a network according to claim 1, wherein the linking means is provided to a card holder message account for receiving messages via a network, wherein the card holder message account is provided notification of the authorization notice in accordance with the authorization notice received from the card provider server.

3. A computer implemented system for ensuring secured dialog between a card holder and a card provider via a network according to claim 1, wherein the virtual agent sends a transaction approval code to the card provider server, the transaction approval code for establishing a transaction approval status for a transaction based on the card holder status.

4. A computer implemented system for ensuring secured dialog between a card holder and a card provider via a network according to claim 1, wherein the virtual agent provides the card holder approval status to the card holder interface.

5. A computer implemented system for ensuring secure dialog between a card holder and a card provider via a network according to claim 1, wherein the linking means provides means for ensuring authorized use of a card holder account by the card holder interface during the communications between the card holder interface and the virtual agent.

6. A computer implemented system for ensuring secure dialog between a card holder and a card provider via a network according to claim 1, wherein the virtual agent ensures authorized use of a card holder account by the card holder interface during the communications between the card holder interface and the virtual agent.

7. A computer implemented system for ensuring secured dialog between a card holder and a card provider via a network according to claim 3, wherein the transaction authorization notice includes an approval notice.

8. A computer implemented system for ensuring secured dialog between a card holder and a card provider via a network according to claim 1, wherein the virtual agent sends a transaction denial code to the card provider server, the transaction denial code for establishing a transaction denial status for the card holder status.

9. A computer implemented method for facilitating secure dialog between a card holder and a card provider via a network, comprising:
   accepting a transaction request from a card holder interface at a merchant transaction processing system via a network;
   requesting a card provider server to provide a transaction authorization of the transaction request;
   receiving a transaction authorization notice from the card provider server in response to the transaction authorization request, wherein the transaction authorization notice comprises an approval notice or a denial notice;
   sending to the card holder interface, in response to a denial notice, a notification in accordance with the transaction authorization notice, the notification including a means for enabling the card holder to establish communication with the virtual agent via the network regarding the denied transaction request by selecting the linking means, which selection transmits information relating to the customer and the denied transaction to the virtual agent.

10. A method according to claim 9 further including the step of allowing authorized account access during communication between the card holder interface and the virtual agent.

11. A method according to claim 9 further including the step of allowing authorized account access prior to the communication between the card holder interface and the virtual agent.

12. A method according to claim 9, wherein the means for enabling the card holder to establish communication with the card provider virtual agent via the network is received at a network based message account accessible by the card holder interface.

13. A computer implemented method of facilitating approval of a transaction using a secured dialog system allowing communication between a card holder and a card provider via a network, comprising:
   receiving a first transaction request at a merchant transaction processing system via a network;
   requesting from a card provider server a transaction authorization of the first transaction request;
   receiving a transaction authorization notice from the card provider server in response to the first transaction authorization request;
   providing, to a card holder interface, the transaction authorization notice, wherein the transaction authorization notice comprises an approval notice or a denial notice;
   providing to the card holder interface, in response to a denial notice, a means for enabling the card holder to establish communication with a card provider virtual agent via the network, regarding the denied transaction request by selecting the linking means, which selection transmits information relating to the customer and the denied transaction to the virtual agent, the virtual agent configured to provide a transaction authorization code to the card provider server;
   receiving the transaction authorization code at the card provider server, the transaction code establishing a transaction approval status or a transaction denial status for a card holder account;
   receiving a second transaction request from the merchant transaction processing system re-requesting a transaction authorization notice from the card provider server; and
   approving the transaction request, and forwarding a transaction request approval notice from the card provider server.

14. A method according to claim 13 further including the step of facilitating authorized account access during communication between the card holder interface and the virtual agent.

15. A method according to claim 13 further including the step of facilitating authorized account access prior to the communication between the card holder interface and the virtual agent.

16. A method according to claim 13 further comprising the step of providing the means for communicating between the card holder interface and a card provider virtual agent via the network to the card holder interface during a transaction request process.

17. A method according to claim 9 further comprising the step of providing the means for enabling the card holder to establish communication with the card provider virtual agent via the network to a network based message account accessible by the card holder interface.

18. A method according to claim 9, further comprising receiving a transaction authorization code from the virtual agent at the card provider server in response to the communication between the card holder interface and the virtual agent, the transaction authorization code establishing a transaction approval status or a transaction denial status for a card holder account.

\* \* \* \* \*